(12) United States Patent
Jones et al.

(10) Patent No.: US 10,377,375 B2
(45) Date of Patent: Aug. 13, 2019

(54) AUTONOMOUS VEHICLE: MODULAR ARCHITECTURE

(71) Applicants: The Charles Stark Draper Laboratory, Inc., Cambridge, MA (US); Veoneer US Inc., Southfield, MI (US)

(72) Inventors: Troy Jones, Somerville, MA (US); Scott Lennox, Arlington, MA (US); John Sgueglia, Cambridge, MA (US); Jon Demerly, Southfield, MI (US); Nicholas Alexander Zervoglos, Acton, MA (US); Hsin-Hsiang Yang, Ann Arbor, MI (US)

(73) Assignees: THE CHARLES STARK DRAPER LABORATORY, INC., Cambridge, MA (US); VEONEER US INC., Southfield, MI (US)

( * ) Notice: Subject to any disclaimer, the term of this patent is extended or adjusted under 35 U.S.C. 154(b) by 273 days.

(21) Appl. No.: 15/280,454

(22) Filed: Sep. 29, 2016

(65) Prior Publication Data

US 2018/0086336 A1  Mar. 29, 2018

(51) Int. Cl.
*B60W 30/09* (2012.01)
*G05D 1/00* (2006.01)
(Continued)

(52) U.S. Cl.
CPC ............ *B60W 30/09* (2013.01); *B60W 10/04* (2013.01); *B60W 10/18* (2013.01); *B60W 10/20* (2013.01); *B60W 30/095* (2013.01); *B60W 50/0097* (2013.01); *B60W 50/02* (2013.01); *G05B 15/02* (2013.01); *G05D 1/0088* (2013.01); *B60W 2400/00* (2013.01); *B60W 2540/00* (2013.01);
(Continued)

(58) Field of Classification Search
CPC combination set(s) only.
See application file for complete search history.

(56) References Cited

U.S. PATENT DOCUMENTS

| 5,917,920 A * | 6/1999 | Humphries | ............. B60R 11/02 |
| | | | 381/86 |
| 6,923,374 B2 * | 8/2005 | Dudeck | .................... B60Q 1/22 |
| | | | 303/191 |

(Continued)

FOREIGN PATENT DOCUMENTS

| DE | 10 2013 212710 | 11/2014 |
| DE | 10 2015 001971 | 8/2016 |

OTHER PUBLICATIONS

International Search Report and Written Opinion of PCT/US2016/054466 dated May 30, 2017 entitled "Autonomous Vehicle With Modular Architecture".

(Continued)

*Primary Examiner* — Thomas G Black
*Assistant Examiner* — Ana D Thomas
(74) *Attorney, Agent, or Firm* — Hamilton, Brook, Smith & Reynolds, P.C (57) ABSTRACT

An architecture for an autonomous vehicle uses a top-down approach to enable fully automated driving. The architecture is modular and compatible with hardware from different manufacturers. Each modular component can be tailored for individual cars, which have different vehicle control subsystems and different sensor subsystems.

28 Claims, 8 Drawing Sheets

(51) Int. Cl.
| | | |
|---|---|---|
| B60W 10/04 | (2006.01) | |
| B60W 10/18 | (2012.01) | |
| B60W 10/20 | (2006.01) | |
| B60W 30/095 | (2012.01) | |
| B60W 50/02 | (2012.01) | |
| B60W 50/00 | (2006.01) | |
| G05B 15/02 | (2006.01) | |

(52) U.S. Cl.
CPC ..... *B60W 2550/20* (2013.01); *B60W 2710/18* (2013.01); *B60W 2710/20* (2013.01); *B60W 2720/10* (2013.01); *B60W 2900/00* (2013.01); *G05D 2201/0213* (2013.01)

(56) References Cited

U.S. PATENT DOCUMENTS

| | | | | |
|---|---|---|---|---|
| 6,926,374 | B2* | 8/2005 | Dudeck | B60T 7/22 |
| | | | | 303/191 |
| 9,120,485 | B1* | 9/2015 | Dolgov | B60W 30/10 |
| 9,151,626 | B1* | 10/2015 | Kojo | G01C 21/30 |
| 9,381,916 | B1* | 7/2016 | Zhu | B60W 30/0956 |
| 2002/0065603 | A1 | 5/2002 | Watanabe | |
| 2004/0167688 | A1 | 9/2004 | Karlsson | |
| 2006/0092295 | A1 | 5/2006 | Mercer | |
| 2008/0243378 | A1* | 10/2008 | Zavoli | G01C 21/28 |
| | | | | 701/533 |
| 2010/0034426 | A1 | 2/2010 | Takiguchi | |
| 2010/0062652 | A1 | 3/2010 | Anderson | |
| 2010/0164789 | A1* | 7/2010 | Basnayake | G01S 5/0072 |
| | | | | 342/357.23 |
| 2010/0256852 | A1 | 10/2010 | Mudalige | |
| 2012/0287280 | A1 | 11/2012 | Essati | |
| 2012/0310504 | A1* | 12/2012 | DuHadway | G01C 21/28 |
| | | | | 701/93 |
| 2012/0310516 | A1* | 12/2012 | Zeng | G01C 21/32 |
| | | | | 701/300 |
| 2014/0195138 | A1* | 7/2014 | Stelzig | G08G 1/0116 |
| | | | | 701/119 |
| 2014/0231576 | A1 | 8/2014 | Rinker | |
| 2015/0254986 | A1* | 9/2015 | Fairfield | G08G 1/22 |
| | | | | 707/687 |
| 2015/0369609 | A1 | 12/2015 | Roumeliotis | |
| 2015/0378015 | A1* | 12/2015 | You | G01S 13/06 |
| | | | | 701/469 |
| 2016/0047657 | A1 | 2/2016 | Caylor | |
| 2018/0087907 | A1* | 3/2018 | DeBitetto | G05D 1/0088 |
| 2018/0089538 | A1* | 3/2018 | Graham | G06T 7/004 |

OTHER PUBLICATIONS

International Search Report and Written Opinion for PCT/US2016/054423 dated Jun. 8, 2017.
Ushani, A.K., et al. "Continuous-time Estimation for Dynamic Obstacle Tracking", 2015 IEEE/RSJ International Conference on Intelligent Robots and Systems, pp. 1137-1143, Sep. 28, 2015.
Ward, E., et al., "Vehicle Localization with Low Cost Radar Sensors", 2016 IEEE Intelligent Vehicles Symposium, pp. 864-870, Jun. 19, 2016.
Dissanayake, M.W.M.G., et al., "A Solution to the Simultaneous Localization and Map Building (SLAM) Problem", IEEE Transactions on Robotics and Automation, pp. 229-241, Jan. 1, 2001.
Mouikis, A.I., et al. "A Multi-State Constraint Kalman Filter for Vision-aided Inertial Navigation", 2007 IEEE International Conference on Robotics and Automation, pp. 3565-3572, Apr. 10-14, 2007.
International Search Report and Written Opinion for PCT/US2106/054438 entitled Autonomous Vehicle: Vehicle Localization dated Sep. 21, 2017.

\* cited by examiner

AUTONOMOUS VEHICLE: MODULAR ARCHITECTURE

BACKGROUND

Currently, vehicles can employ automated systems such as lane assist, pre-collision breaking, and rear cross-track detection. These systems can assist a driver of the vehicle from making human error and to avoid crashes with other vehicles, moving objects, or pedestrians. However, these systems only automate certain vehicle functions, and still rely on the driver of the vehicle for other operations.

SUMMARY

In an embodiment, a method of operating an autonomous vehicle includes determining, at an automated driving controller (ADC), one or more planned driving corridors that are predicted to be drivable by the vehicle and safely separated from surrounding vehicles and other objects. The method further includes determining, at a vehicle controller (VC), based on the one or more planned driving corridors, one or more vehicle trajectories which are predicted to avoid collisions with the surrounding vehicles and other objects. The method further includes selecting, at the VC, one of the determined trajectories as active based on criteria of collision likelihood. The method further includes sending steering, throttle, and braking commands from the VC to one or more respective actuator controllers within the vehicle to follow the active trajectory.

In another embodiment the method further includes, at a perception controller (PC), generating a stochastic prediction of free space available for driving based on locations of observed vehicles or other objects. The method further includes, at the ADC, determining the driving corridors from the stochastic prediction of free space. The method further includes, at the PC, generating a kinematic prediction of the free space available for driving by performing kinematic-based predictions of the locations of vehicles and objects within a threshold radius. The method further includes, at the VC, determining one or more corridor trajectories in a given corridor that meet ride comfort design goals, determining an emergency trajectory from an updated kinematic free space prediction, selecting a nominal or emergency trajectory based on a collision-avoidance likelihood, the collision-avoidance likelihood being based on the updated kinematic free space prediction, generating updated steering, throttle, and braking commands to follow the selected trajectory corridor, and sending updated commands to the actuator controllers for execution.

In a further embodiment, the method includes, at the ADC, planning a route of roadways for the autonomous vehicle to travel to a destination, wherein determining the corridor within the route of roadways is based on information determined by a plurality of sensors about a driving surface and objects surrounding the autonomous vehicle.

In a further embodiment, the method further includes translating inputs from a plurality of sensor subsystems to a vendor-neutral format at a Sensor Interface Server (SIS).

In a further embodiment, the method includes determining a position and an attitude of the autonomous vehicle from a plurality of sensor inputs at a Localization Controller (LC).

In a further embodiment, the method includes determining objects around the autonomous vehicle and on drivable surfaces, detected by a plurality of sensor subsystems, at a Perception Controller (PC).

In a further embodiment, the method includes providing an interface for interaction between an operator, passengers, and humans external to the vehicle at a Human Interaction Controller (HIC).

In a further embodiment, the method includes interacting with other-self driving cars or automated systems through a Machine Interaction Controller (MC).

In a further embodiment, the method includes coordinating exchanges, at a System Controller (SC), of control between an operator and elements of the autonomous vehicle. The system controller can further monitor the elements of the autonomous vehicle for failures or other abnormal behavior, managing corrective actions to resolve failures.

In a further embodiment, the method can include, at the VC, driving outside of the ADC determined corridor in response to determining a likelihood of collision within that corridor.

In a further embodiment, the method includes minimizing use of communication bandwidth in an architecture of the autonomous vehicle by providing a sensor interface server (SIS) configured to translate and filter sensor data sent to other elements of the architecture, a perception controller (PC) configured to fuse sensor measurements from a plurality of sensors into a single estimate of perceptions of the environment around the autonomous vehicle, and a localization controller (LC) configured to fuse outputs from multiple sensor measurements into a single position and attitude of the autonomous vehicle in the world.

In a further embodiment, the method includes measuring availability of the operator of the autonomous vehicle to assist in driving the vehicle and providing a variable level of automated function by the autonomous vehicle based on the measured availability of the operator at a human interface controller (HC).

In a further embodiment, the method includes, at a human interface controller (HC), translating internal status of the autonomous vehicle to a human-understandable format (e.g., visual, audio, haptic), and presenting the translated internal status in the human-understandable format to the operator.

In an embodiment, a system for operating an autonomous vehicle includes an Automated Driving Controller (ADC) configured to determine, one or more planned driving corridors that are predicted to be drivable by the vehicle and safely separated from surrounding vehicles and other objects. The system further includes a vehicle controller (VC) configured to determine, based on the one or more planned driving corridors, one or more vehicle trajectories which are predicted to avoid collisions with the surrounding vehicles and other objects, select one of the determined trajectories as active based on criteria of collision likelihood, and send steering, throttle, and braking commands to one or more respective actuator controllers within the vehicle to follow the active trajectory.

In an embodiment, the system includes a perception controller (PC) configured to generate a stochastic prediction of free space available for driving based on locations of observed vehicles or other objects. The ADC is further configured to determine the driving corridors from the stochastic prediction of free space. The PC is further configured to generate a kinematic prediction of the free space available for driving by performing kinematic-based predictions of the locations of vehicles and objects within a threshold radius. The VC is further configured to determine one or more corridor trajectories in a given corridor that meet ride comfort design goals, determine an emergency trajectory corridor from an updated kinematic free space prediction, select a nominal or emergency trajectory based on a collision-avoidance likelihood, the collision-avoidance likelihood being based on the updated kinematic free space prediction, generate updated steering, throttle, and braking commands to follow the selected trajectory corridor, and send updated commands to the actuator controllers for execution.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1:
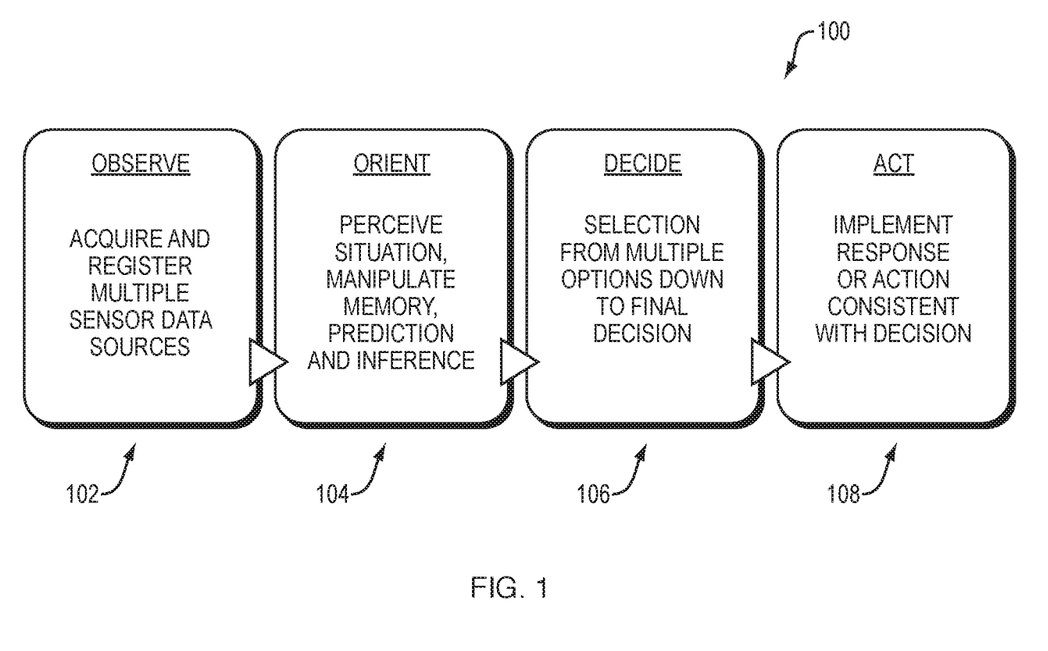
FIG. 1 is a diagram illustrating steps in an embodiment of an automated control system of the Observe, Orient, Decide, and Act (OODA) model.
Figure 2:
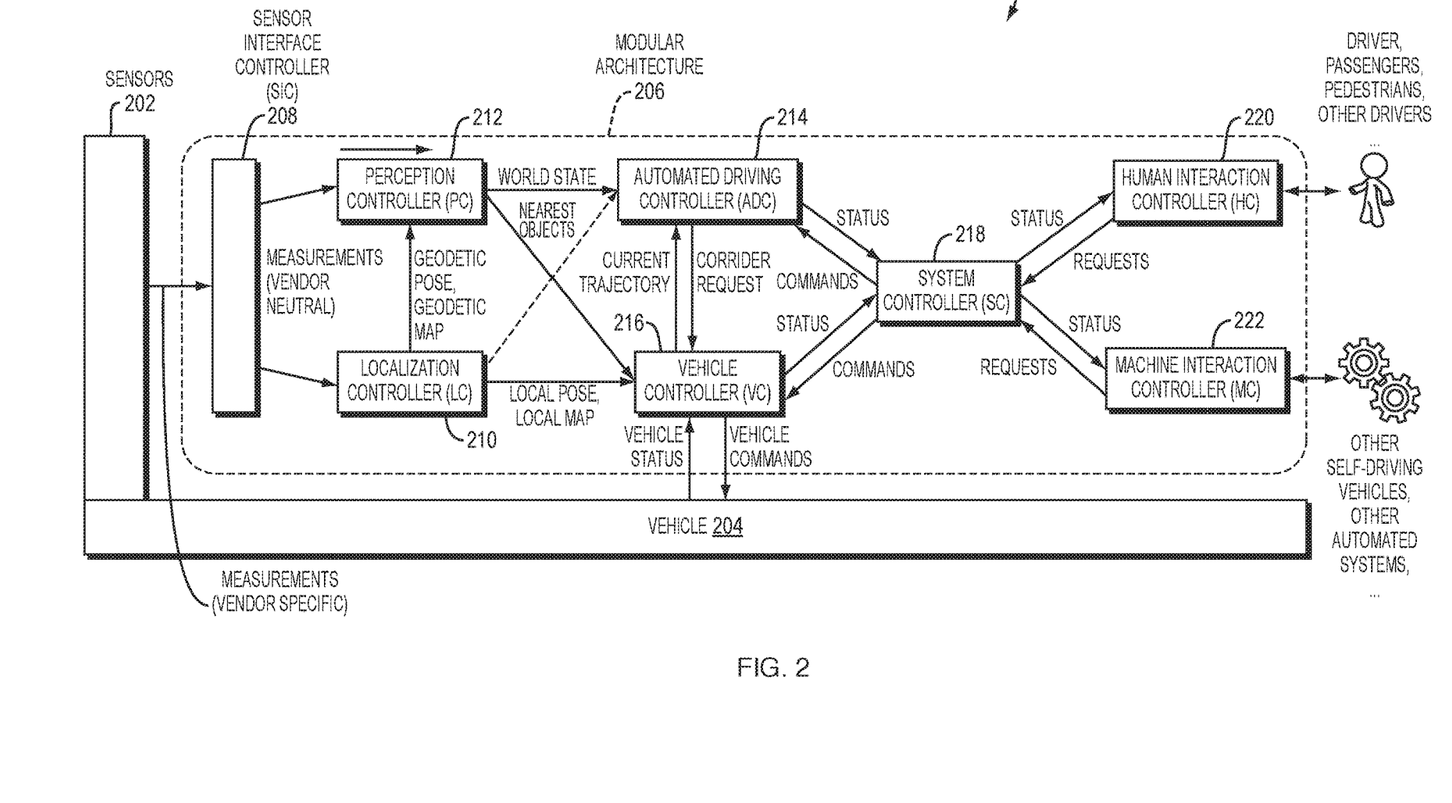
FIG. 2 is a block diagram of an embodiment of an autonomous vehicle high-level architecture.

FIG. 1 is a diagram illustrating steps in an embodiment of an automated control system of the Observe, Orient, Decide, and Act (OODA) model. Automated systems, such as highly-automated driving systems, or, self-driving cars, or autonomous vehicles, employ an OODA model. The observe virtual layer 102 involves sensing features from the world using machine sensors, such as laser ranging, radar, infrared, vision systems, or other systems. The orientation virtual layer 104 involves perceiving situational awareness based on the sensed information. Examples of orientation virtual layer activities are Kalman filtering, model based matching, machine or deep learning, and Bayesian predictions. The decide virtual layer 106 selects an action from multiple objects to a final decision. The act virtual layer 108 provides guidance and control for executing the decision. FIG. 2 is a block diagram 200 of an embodiment of an autonomous vehicle high-level architecture 206. The architecture 206 is built using a top-down approach to enable fully automated driving. Further, the architecture 206 is preferably modular such that it can be adaptable with hardware from different vehicle manufacturers. The architecture 206, therefore, has several modular elements functionally divided to maximize these properties. In an embodiment, the modular architecture 206 described herein can interface with sensor systems 202 of any vehicle 204. Further, the modular architecture 206 can receive vehicle information from and communicate with any vehicle 204.

Elements of the modular architecture 206 include sensors 202, Sensor Interface Controller (SIC) 208, localization controller (LC) 210, perception controller (PC) 212, automated driving controller 214 (ADC), vehicle controller 216 (VC), system controller 218 (SC), human interaction controller 220 (HC) and machine interaction controller 222 (MC).

Referring again to the OODA model of FIG. 1, in terms of an autonomous vehicle, the observation layer of the model includes gathering sensor readings, for example, from vision sensors, Radar (Radio Detection And Ranging), LIDAR (Light Detection And Ranging), and Global Positioning Systems (GPS). The sensors 202 shown in FIG. 2 shows such an observation layer. Examples of the orientation layer of the model can include determining where a car is relative to the world, relative to the road it is driving on, and relative to lane markings on the road, shown by Perception Controller (PC) 212 and Localization Controller (LC) 210 of FIG. 2. Examples of the decision layer of the model include determining a corridor to automatically drive the car, and include elements such as the Automatic Driving Controller (ADC) 214 and Vehicle Controller (VC) 216 of FIG. 2. Examples of the act layer include converting that corridor into commands to the vehicle's driving systems (e.g., steering sub-system, acceleration sub-system, and breaking sub-system) that direct the car along the corridor, such as actuator control 410 of FIG. 4. A person of ordinary skill in the art can recognize that the layers of the system are not strictly sequential, and as observations change, so do the results of the other layers. For example, after the system chooses a corridor to drive in, changing conditions on the road, such as detection of another object, may direct the car to modify its corridor, or enact emergency procedures to prevent a collision. Further, the commands of the vehicle controller may need to be adjusted dynamically to compensate for drift, skidding, or other changes to expected vehicle behavior.

At a high level, the module architecture 206 receives measurements from sensors 202. While different sensors may output different sets of information in different formats, the modular architecture 206 includes Sensor Interface Controller (SIC) 208, sometimes also referred to as a Sensor Interface Server (SIS), configured to translate the sensor data into data having a vendor-neutral format that can be read by the modular architecture 206. Therefore, the modular architecture 206 learns about the environment around the vehicle 204 from the vehicle's sensors, no matter the vendor, manufacturer, or configuration of the sensors. The SIS 208 can further tag each sensor's data with a metadata tag having its location and orientation in the car, which can be used by the perception controller to determine the unique angle, perspective, and blind spot of each sensor.

Further, the modular architecture 206 includes vehicle controller 216 (VC). The VC 216 is configured to send commands to the vehicle and receive status messages from the vehicle. The vehicle controller 216 receives status messages from the vehicle 204 indicating the vehicle's status, such as information regarding the vehicle's speed, attitude, steering position, braking status, and fuel level, or any other information about the vehicle's subsystems that is relevant for autonomous driving. The modular architecture 206, based on the information from the vehicle 204 and the sensors 202, therefore can calculate commands to send from the VC 216 to the vehicle 204 to implement self-driving. The functions of the various modules within the modular architecture 206 are described in further detail below. However, when viewing the modular architecture 206 at a high level, it receives (a) sensor information from the sensors 202 and (b) vehicle status information from the vehicle 204, and in turn, provides the vehicle instructions to the vehicle 204. Such an architecture allows the modular architecture to be employed for any vehicle with any sensor configuration. Therefore, any vehicle platform that includes a sensor subsystem (e.g., sensors 202) and an actuation subsystem having the ability to provide vehicle status and accept driving commands (e.g., actuator control 410 of FIG. 4) can integrate with the modular architecture 206.

Within the modular architecture 206, various modules work together to implement automated driving according to the OODA model. The sensors 202 and SIC 208 reside in the "observe" virtual layer. As described above, the SIC 208 receives measurements (e.g., sensor data) having various formats. The SIC 208 is configured to convert vendor-specific data directly from the sensors to vendor-neutral data. In this way, the set of sensors 202 can include any brand of Radar, LIDAR, image sensor, or other sensors, and the modular architecture 206 can use their perceptions of the environment effectively.

Figure 3:
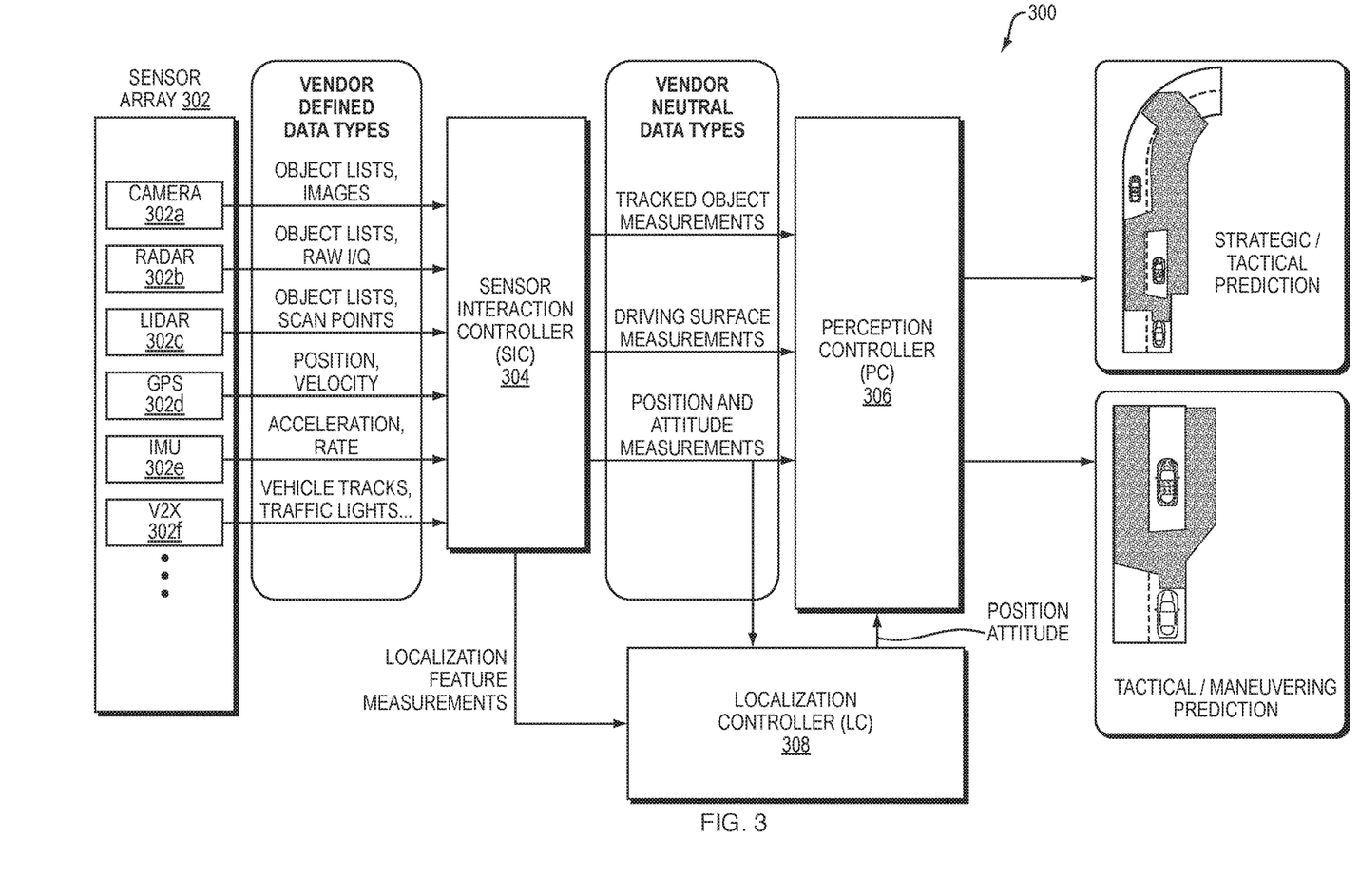
FIG. 3 is a block diagram illustrating an embodiment of the sensor interaction controller (SIC), perception controller (PC), and localization controller (LC).

The measurements output by the sensor interface server are then processed by perception controller (PC) 212 and localization controller (LC) 210. The PC 212 and LC 210 both reside in the "orient" virtual layer of the OODA model. The LC 210 determines a robust world-location of the vehicle that can be more precise than a GPS signal, and still determines the world-location of the vehicle when there is no available or an inaccurate GPS signal. The LC 210 determines the location based on GPS data and sensor data. The PC 212, on the other hand, generates prediction models representing a state of the environment around the car, including objects around the car and state of the road. FIG. 3 provides further details regarding the SIC 208, LC 210 and PC 212.

Figure 4:
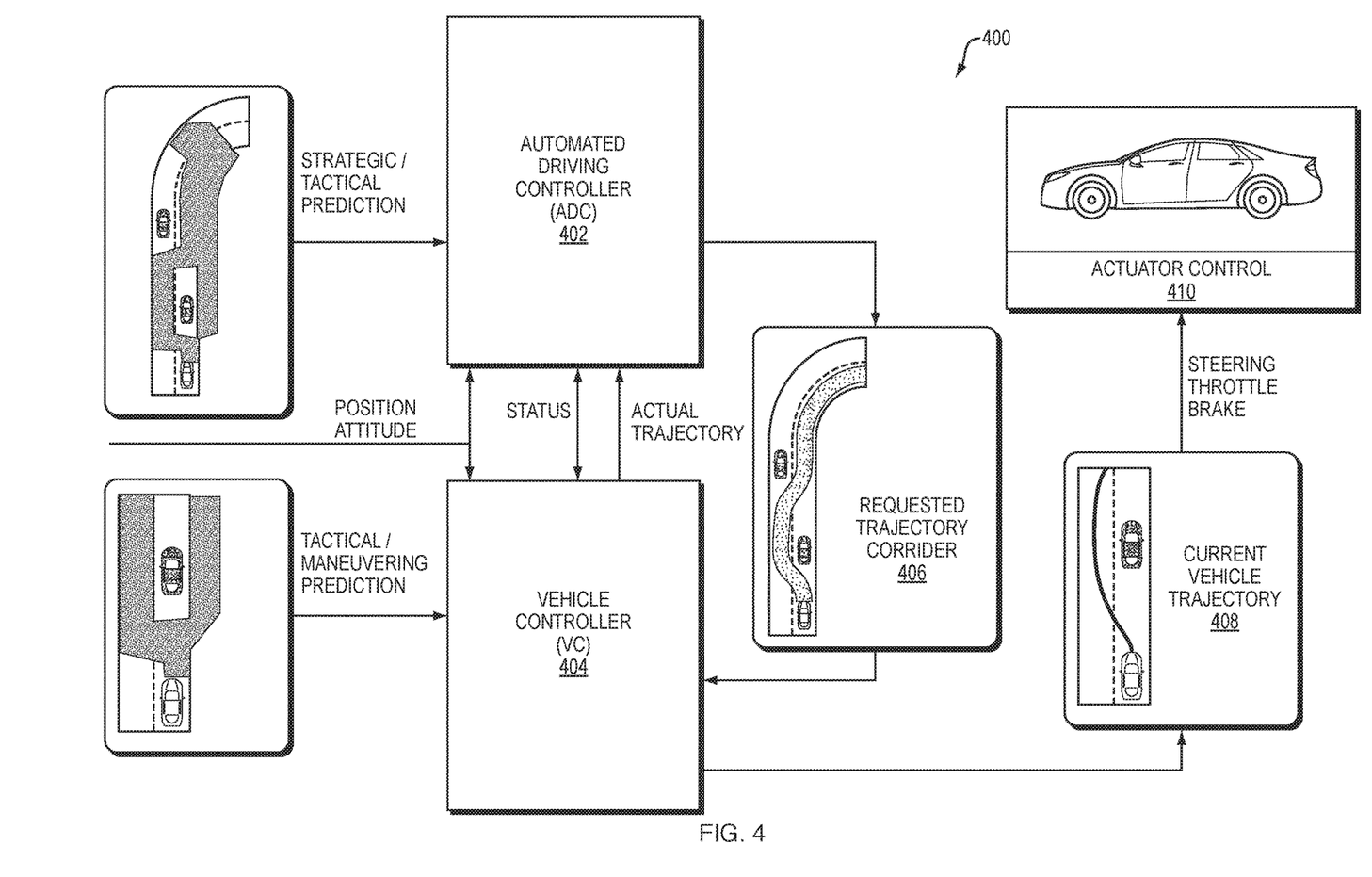
FIG. 4 is a block diagram illustrating an example embodiment of the automatic driving controller (ADC), vehicle controller (VC) and actuator controller.

Automated driving controller 214 (ADC) and vehicle controller 216 (VC) receive the outputs of the perception controller and localization controller. The ADC 214 and VC 216 reside in the "decide" virtual layer of the OODA model. The ADC 214 is responsible for destination selection, route and lane guidance, and high-level traffic surveillance. The ADC 214 further is responsible for lane selection within the route, and identification of safe harbor areas to diver the vehicle in case of an emergency. In other words, the ADC 214 selects a route to reach the destination, and a corridor within the route to direct the vehicle. The ADC 214 passes this corridor onto the VC 216. Given the corridor, the VC 216 provides a trajectory and lower level driving functions to direct the vehicle through the corridor safely. The VC 216 first determines the best trajectory to maneuver through the corridor while providing comfort to the driver, an ability to reach safe harbor, emergency maneuverability, and ability to follow the vehicle's current trajectory. In emergency situations, the VC 216 overrides the corridor provided by the ADC 214 and immediately guides the car into a safe harbor corridor, returning to the corridor provided by the ADC 214 when it is safe to do so. The VC 216, after determining how to maneuver the vehicle, including safety maneuvers, then provides actuation commands to the vehicle 204, which executes the commands in its steering, throttle, and braking subsystems. This element of the VC 216 is therefore in the "act" virtual layer of the CODA model. FIG. 4 describes the ADC 214 and VC 216 in further detail.

The modular architecture 206 further coordinates communication with various modules through system controller 218 (SC). By exchanging messages with the ADC 214 and VC 216, the SC 218 enables operation of human interaction controller 220 (HC) and machine interaction controller 222 (MC). The HC 220 provides information about the autonomous vehicle's operation in a human understandable format based on status messages coordinated by the system controller. The HC 220 further allows for human input to be factored into the car's decisions. For example, the HC 220 enables the operator of the vehicle to enter or modify the destination or route of the vehicle, as one example. The SC 218 interprets the operator's input and relays the information to the VC 216 or ADC 214 as necessary.

Figure 6:
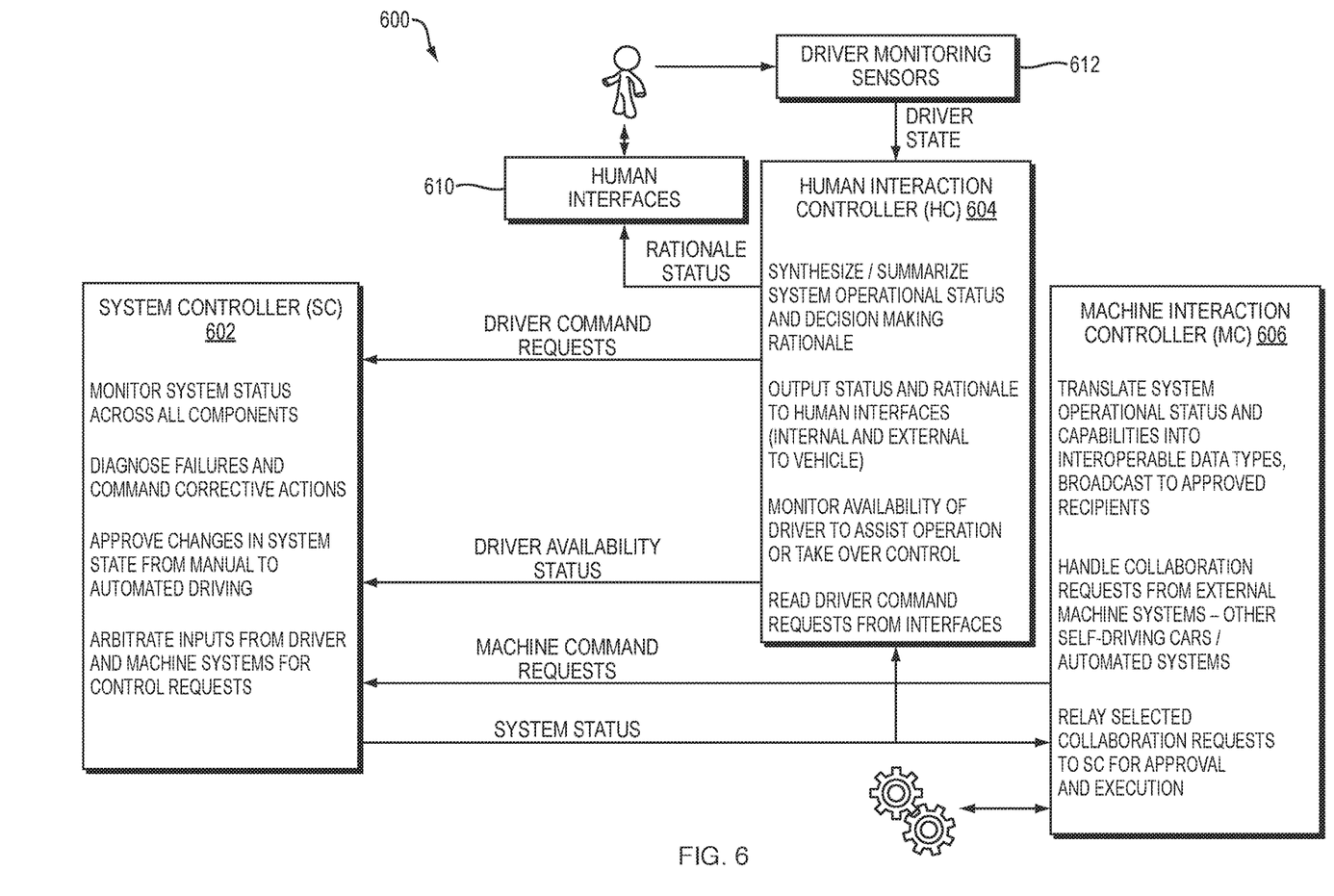
FIG. 6 is a block diagram illustrating an example embodiment of the system controller, human interface controller (HC) and machine interface controller (MC).

Further, the MC 222 can coordinate messages with other machines or vehicles. For example, other vehicles can electronically and wirelessly transmit route intentions, intended corridors of travel, and sensed objects that may be in other vehicle's blind spot to autonomous vehicles, and the MC 222 can receive such information, and relay it to the VC 216 and ADC 214 via the SC 218. In addition, the MC 222 can send information to other vehicles wirelessly. In the example of a turn signal, the MC 222 can receive a notification that the vehicle intends to turn. The MC 222 receives this information via the VC 216 sending a status message to the SC 218, which relays the status to the MC 222. However, other examples of machine communication can also be implemented. For example, other vehicle sensor information or stationary sensors can wirelessly send data to the autonomous vehicle, giving the vehicle a more robust view of the environment. Other machines may be able to transmit information about objects in the vehicles blind spot, for example. In further examples, other vehicles can send their vehicle track. In an even further examples, traffic lights can send a digital signal of their status to aid in the case where the traffic light is not visible to the vehicle. A person of ordinary skill in the art can recognize that any information employed by the autonomous vehicle can also be transmitted to or received from other vehicles to aid in autonomous driving. FIG. 6 shows the HC 220, MC 222, and SC 218 in further detail.

FIG. 3 is a block diagram 300 illustrating an embodiment of the sensor interaction controller 304 (SIC), perception controller (PC) 306, and localization controller (LC) 308. A sensor array 302 of the vehicle can include various types of sensors, such as a camera 302a, radar 302b, LIDAR 302c, GPS 302d, IMU 302e, or vehicle-to-everything (V2X) 302f. Each sensor sends individual vendor defined data types to the SIC 304. For example, the camera 302a sends object lists and images, the radar 302b sends object lists, and in-phase/quadrature (IQ) data, the LIDAR 302c sends object lists and scan points, the GPS 302d sends position and velocity, the IMU 302e sends acceleration data, and the V2X 302f controller sends tracks of other vehicles, turn signals, other sensor data, or traffic light data. A person of ordinary skill in the art can recognize that the sensor array 302 can employ other types of sensors, however. The SIC 304 monitors and diagnoses faults at each of the sensors 302a-f. In addition, the SIC 304 isolates the data from each sensor from its vendor specific package and sends vendor neutral data types to the perception controller (PC) 306 and localization controller 308 (LC). The SIC 304 forwards localization feature measurements and position and attitude measurements to the LC 308, and forwards tracked object measurements, driving surface measurements, and position & attitude measurements to the PC 306. The SIC 304 can further be updated with firmware so that new sensors having different formats can be used with the same modular architecture.

The LC 308 fuses GPS and IMU data with Radar, Lidar, and Vision data to determine a vehicle location, velocity, and attitude with more precision than GPS can provide alone. The LC 308 then reports that robustly determined location, velocity, and attitude to the PC 306. The LC 308 further monitors measurements representing position, velocity, and attitude data for accuracy relative to each other, such that if one sensor measurement fails or becomes degraded, such as a GPS signal in a city, the LC 308 can correct for it. The PC 306 identifies and locates objects around the vehicle based on the sensed information. The PC 306 further estimates drivable surface regions surrounding the vehicle, and further estimates other surfaces such as road shoulders or drivable terrain in the case of an emergency. The PC 306 further provides a stochastic prediction of future locations of objects. The PC 306 further stores a history of objects and drivable surfaces.

The PC 306 outputs two predictions, a strategic prediction, and a tactical prediction. The tactical prediction represents the world around 2-4 seconds into the future, which only predicts the nearest traffic and road to the vehicle. This prediction includes a free space harbor on shoulder of the road or other location. This tactical prediction is based entirely on measurements from sensors on the vehicle of nearest traffic and road conditions.

The strategic prediction is a long term prediction that predicts areas of the car's visible environment beyond the visible range of the sensors. This prediction is for greater than four seconds into the future, but has a higher uncertainty than the tactical prediction because objects (e.g., cars and people) may change their currently observed behavior in an unanticipated manner. Such a prediction can also be based on sensor measurements from external sources including other autonomous vehicles, manual vehicles with a sensor system and sensor communication network, sensors positioned near or on the roadway or received over a network from transponders on the objects, and traffic lights, signs, or other signals configured to communicate wirelessly with the autonomous vehicle.

FIG. 4 is a block diagram 400 illustrating an example embodiment of the automatic driving controller (ADC) 402, vehicle controller (VC) 404 and actuator controller 410. The ADC 402 and VC 404 execute the "decide" virtual layer of the CODA model.

The ADC 402, based on destination input by the operator and current position, first creates an overall route from the current position to the destination including a list of roads and junctions between roads in order to reach the destination. This strategic route plan may be based on traffic conditions, and can change based on updating traffic conditions, however such changes are generally enforced for large changes in estimated time of arrival (ETA). Next, the ADC 402 plans a safe, collision-free, corridor for the autonomous vehicle to drive through based on the surrounding objects and permissible drivable surface—both supplied by the PC. This corridor is continuously sent as a request to the VC 404 and is updated as traffic and other conditions change. The VC 404 receives the updates to the corridor in real time. The ADC 402 receives back from the VC 404 the current actual trajectory of the vehicle, which is also used to modify the next planned update to the driving corridor request.

The ADC 402 generates a strategic corridor for the vehicle to navigate. The ADC 402 generates the corridor based on predictions of the free space on the road in the strategic/tactical prediction. The ADC 402 further receives the vehicle position information and vehicle attitude information from the perception controller of FIG. 3. The VC 404 further provides the ADC 402 with an actual trajectory of the vehicle from the vehicle's actuator control 410. Based on this information, the ADC 402 calculates feasible corridors to drive the road, or any drivable surface. In the example of being on an empty road, the corridor may follow the lane ahead of the car.

In another example of the car needing to pass out a car, the ADC 402 can determine whether there is free space in a passing lane and in front of the car to safely execute the pass. The ADC 402 can automatically calculate based on (a) the current distance to the car to be passed, (b) amount of drivable road space available in the passing lane, (c) amount of free space in front of the car to be passed, (d) speed of the vehicle to be passed, (e) current speed of the autonomous vehicle, and (f) known acceleration of the autonomous vehicle, a corridor for the vehicle to travel through to execute the pass maneuver.

In another example, the ADC 402 can determine a corridor to switch lanes when approaching a highway exit. In addition to all of the above factors, the ADC 402 monitors the planned route to the destination and, upon approaching a junction, calculates the best corridor to safely and legally continue on the planned route.

The ADC 402 the provides the requested corridor 406 to the VC 404, which works in tandem with the ADC 402 to allow the vehicle to navigate the corridor. The requested corridor 406 places geometric and velocity constraints on any planned trajectories for a number of seconds into the future. The VC 404 determines a trajectory to maneuver within the corridor 406. The VC 404 bases its maneuvering decisions from the tactical/maneuvering prediction received from the perception controller and the position of the vehicle and the attitude of the vehicle. As described previously, the tactical/maneuvering prediction is for a shorter time period, but has less uncertainty. Therefore, for lower-level maneuvering and safety calculations, the VC 404 effectively uses the tactical/maneuvering prediction to plan collision-free trajectories within requested corridor 406. As needed in emergency situations, the VC 404 plans trajectories outside the corridor 406 to avoid collisions with other objects.

The VC 404 then determines, based on the requested corridor 406, the current velocity and acceleration of the car, and the nearest objects, how to drive the car through that corridor 406 while avoiding collisions with objects and remain on the drivable surface. The VC 404 calculates a tactical trajectory within the corridor, which allows the vehicle to maintain a safe separation between objects. The tactical trajectory also includes a backup safe harbor trajectory in the case of an emergency, such as a vehicle unexpectedly decelerating or stopping, or another vehicle swerving in front of the autonomous vehicle.

As necessary to avoid collisions, the VC 404 may be required to command a maneuver suddenly outside of the requested corridor from the ADC 402. This emergency maneuver can be initiated entirely by the VC 404 as it has faster response times than the ADC 402 to imminent collision threats. This capability isolates the safety critical collision avoidance responsibility within the VC 404. The VC 404 sends maneuvering commands to the actuators that control steering, throttling, and braking of the vehicle platform.

The VC 404 executes its maneuvering strategy by sending a current vehicle trajectory 408 having driving commands (e.g., steering, throttle, braking) to the vehicle's actuator controls 410. The vehicle's actuator controls 410 apply the commands to the car's respective steering, throttle, and braking systems. The VC 404 sending the trajectory 408 to the actuator controls represent the "Act" virtual layer of the CODA model. By conceptualizing the autonomous vehicle architecture in this way, the VC is the only component needing configuration to control a specific model of car (e.g., format of each command, acceleration performance, turning performance, and braking performance), whereas the ADC remaining highly agnostic to the specific vehicle capacities. In an example, the VC 404 can be updated with firmware configured to allow interfacing with particular vehicle's actuator control systems, or a fleet-wide firmware update for all vehicles.

Figure 5:
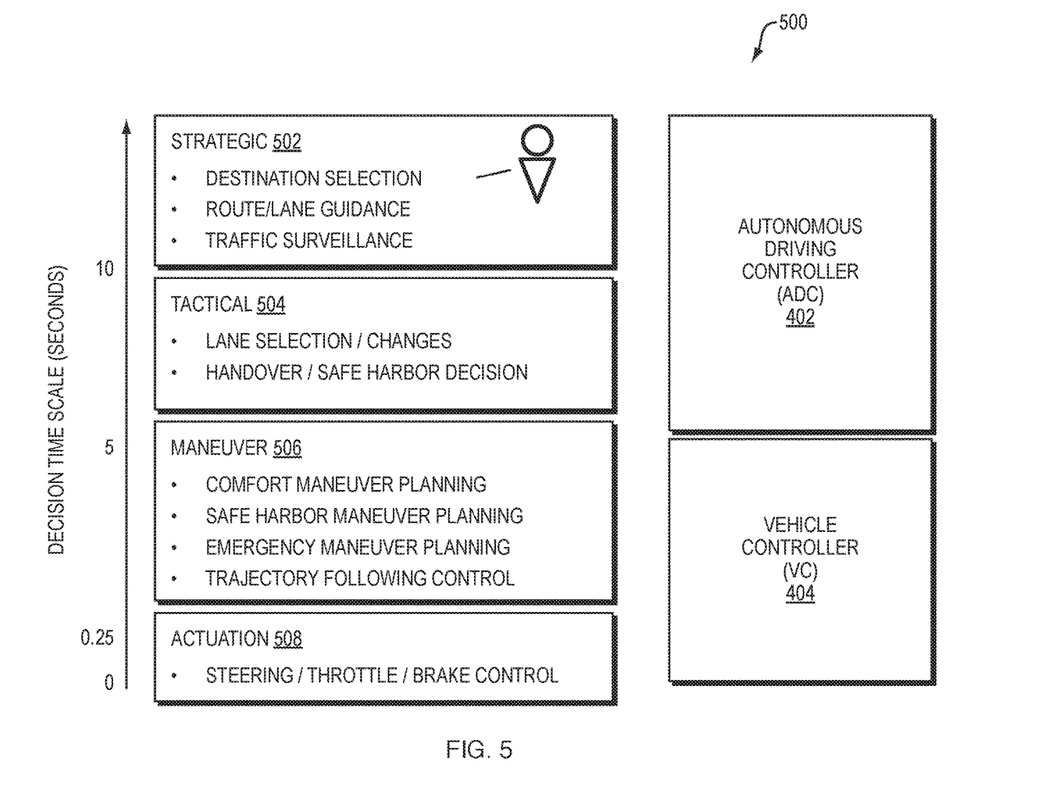
FIG. 5 is a diagram illustrating decision time scales of the ADC and VC.

FIG. 5 is a diagram 500 illustrating decision time scales of the ADC 402 and VC 404. The ADC 402 implements higher-level, strategic 502 and tactical 504 decisions by generating the corridor. The ADC 402 therefore implements the decisions having a longer range/or time scale. The estimate of world state used by the ADC 402 for planning strategic routes and tactical driving corridors for behaviors such as passing or making turns has higher uncertainty, but predicts longer into the future, which is necessary for planning these autonomous actions. The strategic predictions have high uncertainty because they predict beyond the sensor's visible range, relying solely on non-vision technologies, such as Radar, for predictions of objects far away from the car, that events can change quickly due to, for example, a human suddenly changing his or her behavior, or the lack of visibility of objects beyond the visible range of the sensors. Many tactical decisions, such as passing a car at highway speed, require perception Beyond the Visible Range (BVR) of an autonomous vehicle (e.g., 100 m or greater), whereas all maneuverability 506 decisions are made based on locally perceived objects to avoid collisions.

The VC 404, on the other hand, generates maneuverability decisions 506 using maneuverability predictions that are short time frame/range predictions of object behaviors and the driving surface. These maneuverability predictions have a lower uncertainty because of the shorter time scale of the predictions, however, they rely solely on measurements taken within visible range of the sensors on the autonomous vehicle. Therefore, the VC 404 uses these maneuverability predictions (or estimates) of the state of the environment immediately around the car for fast response planning of collision-free trajectories for the autonomous vehicle. The VC 402 issues actuation commands, on the lowest end of the time scale, representing the execution of the already planned corridor and maneuvering through the corridor.

FIG. 6 is a block diagram 600 illustrating an example embodiment of the system controller 602, human interface controller 604 (HC) and machine interface controller 606 (MC). The human interaction controller 604 (HC) receives input command requests from the operator. The HC 604 also provides outputs to the operator, passengers of the vehicle, and humans external to the autonomous vehicle. The HC 604 provides the operator and passengers (via visual, audio, haptic, or other interfaces) a human-understandable representation of the system status and rationale of the decision making of the autonomous vehicle. For example, the HC 604 can display the vehicle's long-term route, or planned corridor and safe harbor areas. Additionally, the HC 604 reads sensor measurements about the state of the driver, allowing the HC 604 to monitor the availability of the driver to assist with operations of the car at any time. As one example, a sensor system within the vehicle could sense whether the operator has hands on the steering wheel. If so, the HC 604 can signal that a transition to operator steering can be allowed, but otherwise, the HC 604 can prevent a turnover of steering controls to the operator. In another example, the HC 604 can synthesize and summarize decision making rationale to the operator, such as reasons why it selected a particular route. As another example, a sensor system within the vehicle can monitor the direction the driver is looking. The HC 604 can signal that a transition to driver operation is allowed if the driver is looking at the road, but if the driver is looking elsewhere, the system does not allow operator control. In a further embodiment, the HC 604 can take over control, or emergency only control, of the vehicle while the operator checks the vehicle's blind spot and looks away from the windshield.

The machine interaction controller 606 (MC) interacts with other autonomous vehicles or automated system to coordinate activities such as formation driving or traffic management. The MC 606 reads the internal system status and generates an output data type that can be read by collaborating machine systems, such as the V2X data type. This status can be broadcast over a network by collaborating systems. The MC 606 can translate any command requests from external machine systems (e.g., slow down, change route, merge request, traffic signal status) into commands requests routed to the SC for arbitration against the other command requests from the HC 604. The MC 606 can further authenticate (e.g., using signed messages from other trusted manufacturers) messages from other systems to ensure that they are valid and represent the environment around the car. Such an authentication can prevent tampering from hostile actors.

The system controller 602 (SC) serves as an overall manager of the elements within the architecture. The SC 602 aggregates the status data from all of the system elements to determine total operational status, and sends commands to the elements to execute system functions. If elements of the system report failures, the SC 602 initiates diagnostic and recovery behaviors to ensure autonomous operation such that the vehicle remains safe. Any transitions of the vehicle to/from an automated state of driving are approved or denied by the SC 602 pending the internal evaluation of operational readiness for automated driving and the availability of the human driver.

Figure 7:
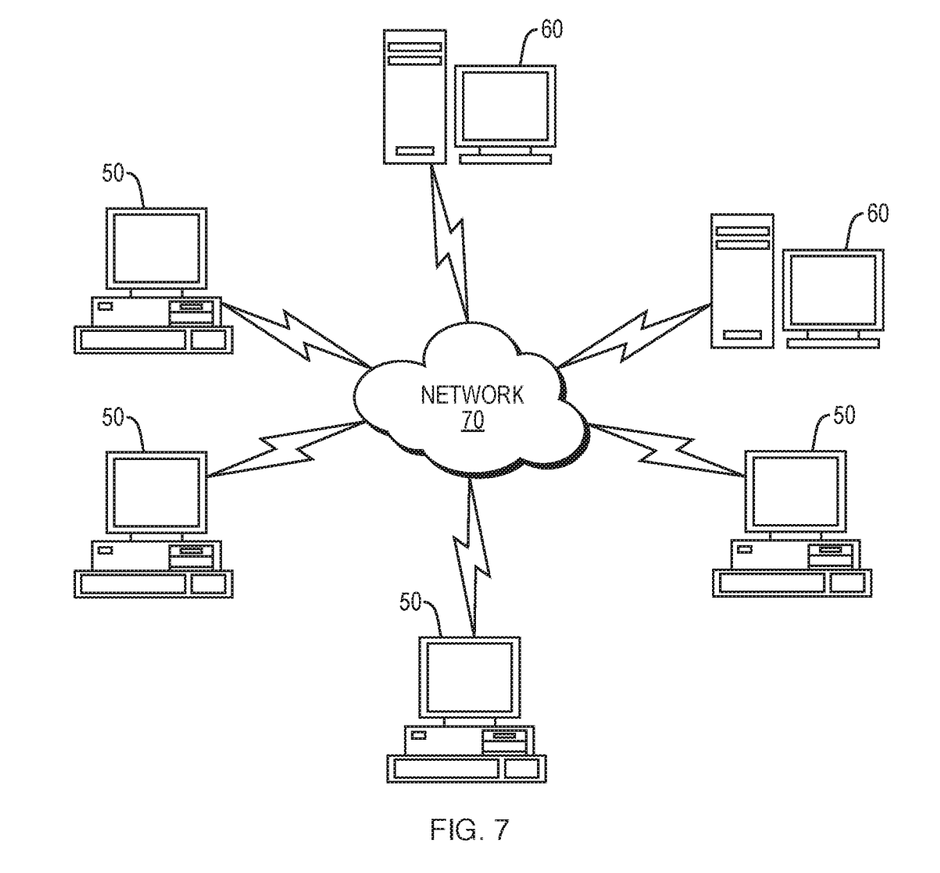
FIG. 7 illustrates a computer network or similar digital processing environment in which embodiments of the present invention may be implemented.

FIG. 7 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 8:
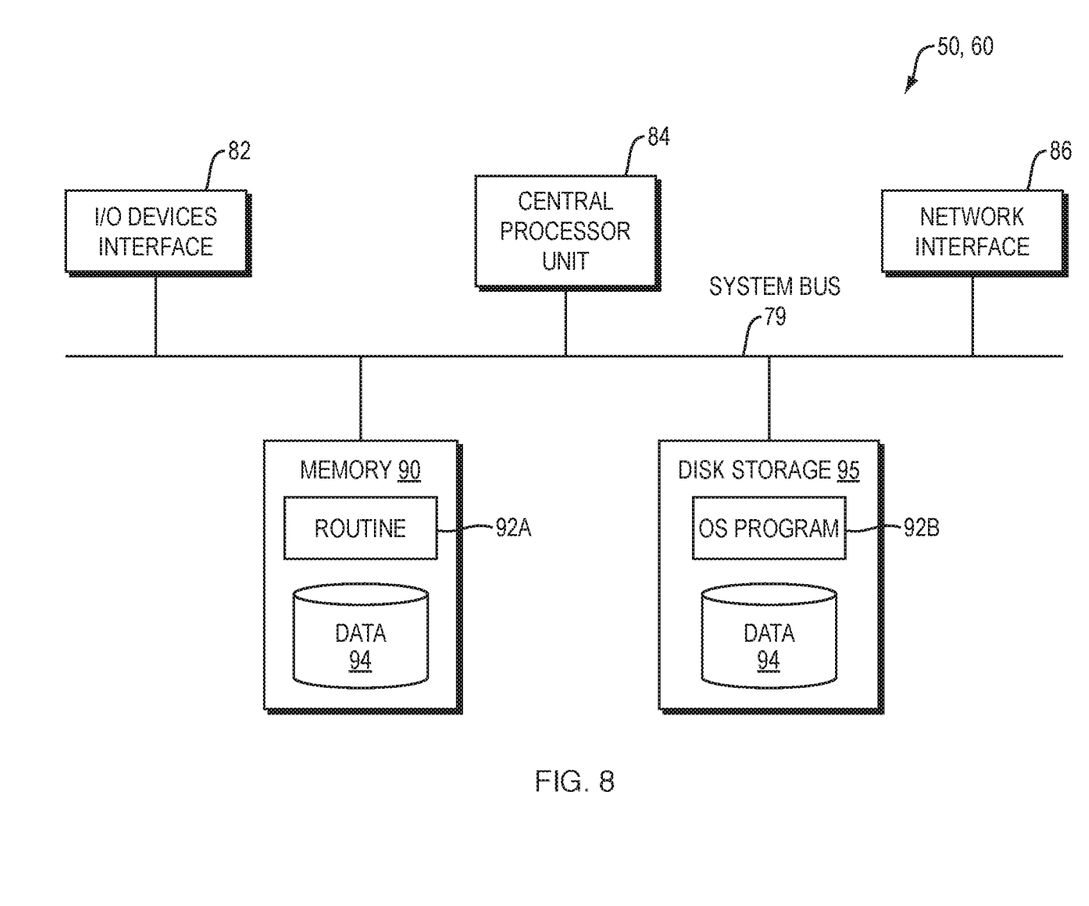
FIG. 8 is a diagram of an example internal structure of a computer (e.g., client processor/device or server computers in the computer system of FIG. 7.

FIG. 8 is a diagram of an example internal structure of a computer (e.g., client processor/device 50 or server computers 60) in the computer system of FIG. 7. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 7). Memory 90 provides volatile storage for computer software instructions 92 and data 94 used to implement an embodiment of the present invention (e.g., sensor interface controller, perception controller, localization controller, automated driving controller, vehicle controller, system controller, human interaction controller, and machine interaction controller detailed above). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

What is claimed is:

1. A method of operating an autonomous vehicle, the method comprising:
   determining, at an automated driving controller (ADC), one or more planned driving corridors that are predicted to be drivable by the vehicle and safely separated from surrounding vehicles and other objects;
   determining, at a vehicle controller (VC), based on the one or more planned driving corridors, one or more vehicle trajectories which are predicted to avoid collisions with the surrounding vehicles and other objects;
   selecting, at the VC, one of the determined trajectories as active based on criteria of collision likelihood;
   sending steering, throttle, and braking commands from the VC to one or more respective actuator controllers within the vehicle to follow the active trajectory.

2. The method of claim 1, further comprising:
   at a perception controller (PC), generating a stochastic prediction of free space available for driving based on locations of observed vehicles or other objects;
   at the ADC, determining the driving corridors from the stochastic prediction of free space;
   at the PC, generating a kinematic prediction of the free space available for driving by performing kinematic-based predictions of the locations of vehicles and objects within a threshold radius;
   at the VC:
      determining one or more corridor trajectories in a given corridor that meet ride comfort design goals;
      determining an emergency trajectory from an updated kinematic free space prediction;
      selecting a nominal or emergency trajectory based on a collision-avoidance likelihood, the collision-avoidance likelihood being based on the updated kinematic free space prediction;
      generating updated steering, throttle, and braking commands to follow the selected trajectory corridor; and
      sending updated commands to the actuator controllers for execution.

3. The method of claim 1, further comprising:
   at the ADC:
      planning a route of roadways for the autonomous vehicle to travel to a destination, wherein determining the corridor within the route of roadways is based on information determined by a plurality of sensors about a driving surface and objects surrounding the autonomous vehicle.

4. The method of claim 1, further comprising:
   translating inputs from a plurality of sensor subsystems to a vendor-neutral format at a sensor interface server (SIS).

5. The method of claim 1, further comprising:
   determining a position and an attitude of the autonomous vehicle from a plurality of sensor inputs at a localization controller (LC).

6. The method of claim 1, further comprising:
   determining objects around the autonomous vehicle and on drivable surfaces, detected by a plurality of sensor subsystems, at a perception controller (PC).

7. The method of claim 1, further comprising:
   providing an interface for interaction between an operator, passengers, and humans external to the vehicle at a human interaction controller (HIC).

8. The method of claim 1, further comprising:
   interacting with other-self driving cars or automated systems through a machine interface controller (MC).

9. The method of claim 1, further comprising:
   coordinating exchanges, at a system controller (SC), of control between an operator and elements of the autonomous vehicle.

10. The method of claim 9, further comprising:
    monitoring the elements of the autonomous vehicle for failures or other abnormal behavior, managing corrective actions to resolve failures.

11. The method of claim 1, further comprising:
    at the VC, driving outside of the ADC determined corridor in response to determining a likelihood of collision within that corridor.

12. The method of claim 1, further comprising:
    minimizing use of communication bandwidth in an architecture of the autonomous vehicle by providing:
       a sensor interface server (SIS) configured to translate and filter sensor data sent to other elements of the architecture;
       a perception controller (PC) configured to fuse sensor measurements from a plurality of sensors into a single estimate of perceptions of the environment around the autonomous vehicle; and
       a localization controller (LC) configured to fuse outputs from multiple sensor measurements into a single position and attitude of the autonomous vehicle in the world.

13. The method of claim 1, further comprising:
    measuring availability of the operator of the autonomous vehicle to assist in driving the vehicle; and providing a variable level of automated function by the autonomous vehicle based on the measured availability of the operator at a human interface controller (HC).

14. The method of claim 1, further comprising:
at a human interface controller (HC):
translating internal status of the autonomous vehicle to a human understandable format; and
presenting the translated internal status in the human understandable format to the operator.

15. A system for operating an autonomous vehicle, the system comprising:
an automated driving controller (ADC) configured to determine, one or more planned driving corridors that are predicted to be drivable by the vehicle and safely separated from surrounding vehicles and other objects; and
a vehicle controller (VC) configured to:
determine, based on the one or more planned driving corridors, one or more vehicle trajectories which are predicted to avoid collisions with the surrounding vehicles and other objects;
select one of the determined trajectories as active based on criteria of collision likelihood; and
send steering, throttle, and braking commands to one or more respective actuator controllers within the vehicle to follow the active trajectory.

16. The system of claim 15, further comprising:
a perception controller (PC) configured to generate a stochastic prediction of free space available for driving based on locations of observed vehicles or other objects;
wherein the ADC is further configured to determine the driving corridors from the stochastic prediction of free space;
wherein the PC is further configured to generate a kinematic prediction of the free space available for driving by performing kinematic-based predictions of the locations of vehicles and objects within a threshold radius;
wherein the VC is further configured to:
determine one or more corridor trajectories in a given corridor that meet ride comfort design goals;
determine an emergency trajectory corridor from an updated kinematic free space prediction;
select a nominal or emergency trajectory based on a collision-avoidance likelihood, the collision-avoidance likelihood being based on the updated kinematic free space prediction;
generate updated steering, throttle, and braking commands to follow the selected trajectory corridor; and
send updated commands to the actuator controllers for execution.

17. The system of claim 15, wherein the ADC is further configured to plan a route of roadways for the autonomous vehicle to travel to a destination, wherein determining the corridor within the route of roadways is based on information determined by a plurality of sensors about the driving surface and objects surrounding the autonomous vehicle.

18. The system of claim 15, further comprising:
a sensor interface server (SIS) configured to translate inputs from a plurality of sensor subsystems to a vendor-neutral format.

19. The system of claim 15, further comprising:
a localization controller configured to determine a position and an attitude of the autonomous vehicle from a plurality of sensor inputs.

20. The system of claim 15, further comprising:
a perception controller (PC) configured to determine objects around the autonomous vehicle and on drivable surfaces, detected by a plurality of sensor subsystems.

21. The system of claim 15, further comprising:
a human interaction controller (HC) configured to provide an interface for interaction between an operator, passengers, and humans external to the vehicle.

22. The system of claim 16, further comprising:
machine interaction controller (MC) configured to interact with other-self driving cars or automated systems.

23. The system of claim 15, further comprising:
a system controller (SC) configured to coordinate exchanges of control between the operator and elements of the modular architecture of the autonomous vehicle.

24. The system of claim 23, wherein the SC is further configured to monitor the elements of the autonomous vehicle for failures or other abnormal behavior, managing corrective actions to resolve failures.

25. The system of claim 15, wherein the vehicle controller is further configured to drive outside the ADC generated corridor in response to determining a high likelihood of collision within that corridor.

26. The system of claim 15, further comprising:
a sensor interface server (SIS) configured to translate and filter sensor data sent to other elements of the architecture;
a perception controller (PC) configured to fuse sensor measurements from the plurality of sensors into a single estimate of perceptions of the environment around the autonomous vehicle; and
a localization controller (LC) configured to fuse outputs from multiple sensors measurements into a single position and attitude of the autonomous vehicle in the world;
wherein the sensor interface server, perception controller, and localization controller minimize use of communication bandwidth in an architecture of the autonomous vehicle.

27. The system of claim 15, further comprising:
a human interaction controller (HC) configured to measure availability of the operator of the autonomous vehicle to assist in driving the vehicle, and provide a variable level of automated function by the autonomous vehicle based on the measured availability of the operator.

28. The system of claim 15, further comprising:
a human interaction controller (HC) configured to translate internal status of the autonomous vehicle to a human-understandable format, and present the translated internal status in the human-understandable format to the operator.

* * * * *